(12) United States Patent
Hess et al.

(10) Patent No.: US 8,740,589 B2
(45) Date of Patent: Jun. 3, 2014

(54) VACUUM PUMP

(75) Inventors: Bernd Hess, Nuertingen (DE); Willi Schneider, Bodelshausen (DE)

(73) Assignee: Joma-Polytec GmbH, Bodelshausen (DE)

( * ) Notice: Subject to any disclaimer, the term of this patent is extended or adjusted under 35 U.S.C. 154(b) by 245 days.

(21) Appl. No.: 12/998,679

(22) PCT Filed: Jul. 24, 2009

(86) PCT No.: PCT/EP2009/059539
§ 371 (c)(1),
(2), (4) Date: Jul. 26, 2011

(87) PCT Pub. No.: WO2010/057688
PCT Pub. Date: May 27, 2010

(65) Prior Publication Data
US 2011/0293451 A1 Dec. 1, 2011

(30) Foreign Application Priority Data

Nov. 20, 2008 (DE) .......................... 10 2008 059 227

(51) Int. Cl.
*F16L 37/127* (2006.01)
(52) U.S. Cl.
USPC ............................ 417/437; 285/319; 285/331
(58) Field of Classification Search
CPC .. F16L 37/0985; F16L 37/0987; F16L 37/127
USPC ................................... 417/437; 285/319, 331
See application file for complete search history.

(56) References Cited

U.S. PATENT DOCUMENTS

| | | | |
|---|---|---|---|
| 5,078,429 A | 1/1992 | Braut |
| 5,106,127 A | 4/1992 | Briet |
| 5,242,581 A | 9/1993 | Mohr |
| 5,711,550 A | 1/1998 | Brandt |
| 6,199,919 B1 | 3/2001 | Kawasaki |
| 6,971,684 B2 | 12/2005 | Ferrari |

FOREIGN PATENT DOCUMENTS

| | | |
|---|---|---|
| DE | 31 05 665 | 3/1982 |
| DE | 101 47 325 | 5/2002 |
| EP | 0 769 650 | 4/1997 |
| EP | 1 074 781 | 2/2001 |
| EP | 1 387 117 | 2/2004 |
| FR | 2 815 384 | 4/2002 |
| GB | 2 371 351 | 7/2002 |
| WO | WO 01/44710 | 6/2001 |
| WO | WO 2004/065795 | 8/2004 |
| WO | WO 2007/076995 | 7/2007 |
| WO | WO 2008/009251 | 1/2008 |

OTHER PUBLICATIONS

DuPont Technische Kunststoffe, Allgemeine Konstruktionsprinzipien—Modul I, Mar. 2002.

*Primary Examiner* — Charles Freay
*Assistant Examiner* — Patrick Hamo
(74) *Attorney, Agent, or Firm* — Paul Vincent

(57) ABSTRACT

The invention relates to a vacuum pump, in particular a vane cell pump, having a housing in which a suction space is provided, and a housing passage opening into the suction space, wherein a suction non-return valve opening to the outside or into an external vacuum space is arranged in the housing passage, said valve being accommodated in a crucible-shaped housing and the crucible-shaped housing having a housing jacket, wherein the suction non-return valve can be latched in the pump housing passage.

8 Claims, 3 Drawing Sheets

VACUUM PUMP

This application is the national stage of PCT/EP2009/059539 filed on Jul. 24, 2009 and claims Paris Convention Priority to DE 10 2008 059 227.7 filed Nov. 20, 2008.

BACKGROUND OF THE INVENTION

The invention concerns a vacuum pump, in particular a vane cell pump, having a pump housing in which a suction chamber is provided, and a pump housing opening which opens into the suction chamber, wherein a suction check valve opening to the outside or into an external vacuum chamber is arranged in the pump housing opening and is accommodated in a pot-shaped valve housing, the pot-shaped valve housing having a housing jacket.

WO 2008/009251 A1 discloses a vacuum pump having a construction of this type. This vacuum pump extracts air from a vacuum chamber, e.g. a power brake unit, wherein the suction chamber is formed by vane cells inside the vacuum pump. In order to prevent backflow, the vacuum pump has a suction check valve which is disposed in a pump housing opening. This suction check valve is designed like a sleeve and has a pot-shaped valve housing with a housing jacket and a housing bottom, wherein the housing bottom is inserted into the pump housing of the vacuum pump. A suction hose is e.g. pushed onto the free end of the suction check valve which projects out of the pump housing of the vacuum pump. The suction check valve is sealed in the pump housing opening e.g. using sealing elements, for example O-rings. The suction check valve of the above-mentioned conventional vacuum pump is held on the pump housing and in the pump housing opening in that the edge of the pump housing opening overlaps a flange of the suction check valve such that the free end of the edge can be flanged or caulked and the flange is fixed in the pump housing opening. Mounting of the suction check valve therefore requires an additional work step and additional tools. The pump housing is moreover deformed. It must therefore be made from a plastically deformable material and must not be brittle.

It is regarded as disadvantageous that the suction check valve must be fixed to the pump housing in a separate work step. Moreover, the pump housing must consist of a plastically deformable material.

It is therefore the object of the invention to provide a vacuum pump which facilitates fixing the suction check valve thereto.

SUMMARY OF THE INVENTION

This object is achieved in accordance with the invention with a vacuum pump of the above-mentioned type in that the suction check valve can be locked in the pump housing opening.

The suction check valve of the inventive vacuum pump is not only inserted into the pump housing opening but is thereby also locked to the pump housing. No additional work step is required for permanently fixing the suction check valve to the pump housing. In particular, neither the suction check valve nor the housing of the vacuum pump must be deformed or modified in any other fashion for fixing the suction check valve. Nor are bonding agents, such as adhesive or the like, required for mounting. Mounting of the suction check valve to the pump housing can therefore not only be facilitated and performed within less time but also performed by machines.

In a further development of the invention, the suction check valve and/or the pump housing opening has/have at least one undercut. This undercut is used to receive a latching means as soon as this latching means engages the undercut. The latching means is designed in such a fashion that it is not automatically released from the undercut and therefore prevents the suction check valve from being pulled out.

In accordance with the invention, the suction check valve and/or the pump housing opening is/are provided with at least one latching hook. This latching hook is disposed in such a fashion that the suction check valve can be easily inserted into the pump housing opening, thereby deflecting the latching hook. When the suction check valve has been completely inserted into the pump housing opening, the latching hook moves to the area of the undercut and engages therein. This undercut is formed in such a fashion that it engages behind the latching hook and blocks or retains it. The suction check valve is thereby prevented from being pulled out of the pump housing opening.

In a further development of the invention, the latching hook is disposed radially outside of the housing jacket. The housing jacket forms the fluid-tight connection e.g. between a suction hose, which is disposed outside of the vacuum pump, and the suction chamber, and the latching hook is only used for locking fixation of the suction check valve to the pump housing. It is advantageously disposed in such a fashion that it can no longer be accessed from the outside after insertion of the suction check valve into the pump housing opening. The suction check valve can only be removed from the pump housing by destroying the suction check valve.

In a preferred variant, the latching hook has a latching finger which can be radially pivoted with respect to the housing jacket of the suction check valve and has a terminal latch. The latch projects in a radial direction, in particular, past the outer contour of the housing jacket such that the latch is initially radially displaced during insertion of the suction check valve and, upon complete insertion of the suction check valve into the pump housing opening, radially snaps out into a receptacle provided for this purpose, in particular into an undercut.

In a further development, the suction check valve and/or the housing opening has/have a circumferential groove. This circumferential groove of the pump housing opening is designed in the form of an inner circumferential groove and that of the suction check valve is designed in the form of an outer circumferential groove, the circumferential groove being used to receive a latching element of the latching hook. The circumferential groove may thereby be designed to extend along the overall circumference such that rotation of the inserted locking suction check valve is not impeded.

The circumferential groove may also only extend over a partial area of the circumference, such that the suction check valve is not only fixed in an axial direction, i.e. in the insertion or removal direction, but also in the direction of rotation. Rotation of the suction check valve within the pump housing opening is thereby prevented.

In one variant of the invention, the undercut is formed by at least one opening in the pump housing. The latches of the latching fingers are locked in this opening. The suction check valve is then not only reliably fixed to the pump housing but also secured against rotation.

The suction check valve is removed by inserting a tool from the outside into the opening for lifting the latch out of the opening.

In another variant for removing the suction check valve, an inner circumferential groove is provided in the pump housing, which extends in a radial direction, at least in sections, parallel, next to and, in the insertion direction of the suction check valve, behind the opening, and terminates in the peripheral direction in the inner circumference of the pump housing opening. When the suction check valve, which is locked with the pump housing, is further inserted into the pump housing, the inclined latches slide out of the opening and move to the inner circumferential groove. The suction check valve can then be rotated, thereby lifting the latches out of the inner circumferential groove such that they abut the non-recessed inner circumferential surface of the pump housing opening. The suction check valve can then be removed. A support spring, which acts on the front side of the suction check valve and is pretensioned during insertion of the suction check valve, ensures reliable retention of the suction check valve in the pump housing. Locking is realized in the manner of bayonet locking.

Further advantages, features and details of the invention can be extracted from the dependent claims and the following description which describes in detail a particularly preferred embodiment with reference to the drawing. The features shown in the drawing and recited in the description and the claims may be essential to the invention either individually or in arbitrary combination.

DESCRIPTION OF THE PREFERRED EMBODIMENT

Figure 1:
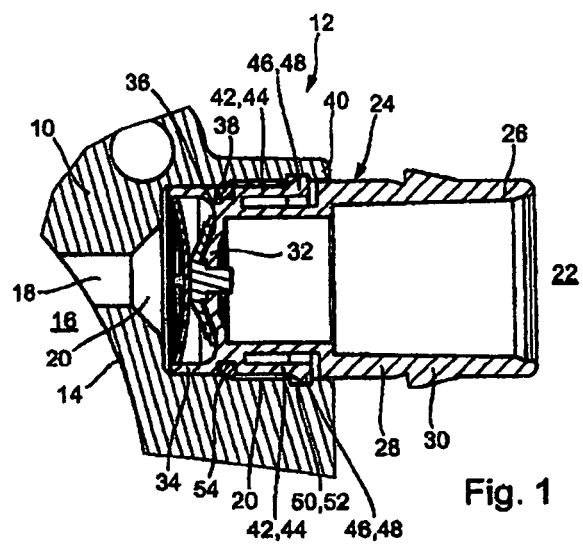
FIG. 1 shows a longitudinal section I-I in accordance with FIG. 2 through a suction check valve that is inserted into a pump housing.

FIG. 1 schematically shows a section of a pump housing of a vacuum pump 12, which is designated in total with 10, wherein 14 designates the inner circumferential surface of a suction chamber 16. A channel 18 of a pump housing opening 20 opens into this suction chamber 16 and opens to the outside 22. A suction check valve 24 is inserted into this pump housing opening 20, onto the free end 26 of which a suction hose (not shown) may be pushed. The suction check valve 24, which is shown in a longitudinal section, has a valve housing 28 having a pot-shaped design and being substantially formed by a housing jacket 30 and a housing bottom 32. The housing jacket 30 extends past the housing bottom 32 to an edge 34 which projects past the housing bottom 32 on its opposing side. The valve housing 28 has a circumferential groove 36 into which a sealing ring 38, in particular an O-ring, is inserted for fluid-tight reception of the suction check valve 24 in the pump housing opening 20.

FIG. 1 clearly shows that the edge 34 of the suction check valve 24 is inserted into the pump housing opening 20 with tight fit in a radial direction. The housing jacket 30 also abuts the free end 40 of the pump housing opening 20 such that the suction check valve 24 is seated in the pump housing opening 20 without play in the radial direction.

Figure 2:
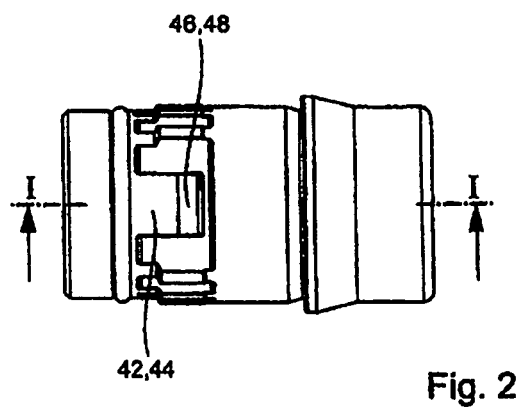
FIG. 2 shows a side view of the suction check valve.

Both FIG. 1 and FIG. 2 show that the suction check valve 24 has a latching means 42 which is designed as a latching hook 44 which substantially extends along the outer side of the housing jacket 30 in the axial direction, and one end of which is formed in one piece on the housing jacket 30 and the other free end 46 of which radially projects past the outer circumference or the outer contour of the housing jacket 30. The free end 46 of the latching hook 44 is designed like a latch 48 and engages in an undercut 50 which is provided on the inner circumferential surface in the area of the free end 40 of the pump housing opening 20. The undercut 50 is designed as an inner circumferential groove 52.

It should also be emphasized that the diameter of the pump housing opening 20 in the area of the sealing ring 38 has a recess 54, i.e. the diameter of the pump housing opening 20 is reduced in the insertion direction. The sealing ring 38 therefore abuts the recessed edge 54, which is advantageous in that the sealing effect of the recessed edge 54 is improved compared to the case in which the sealing ring 38 flatly abuts the inner surface of the pump housing opening 20. The sealing ring 38 is moreover not only used as a sealing means for fluid-tight sealing of the suction check valve 24 in the pump housing opening 20 but is also used as a pretensioning means such that the suction check valve 24 is pretensioned in the direction in which it is pushed out when the sealing ring 38 abuts the recessed edge 54. This ensures that the latches 48 engage (as viewed in the axial direction) without play in the inner circumferential groove 52 and thereby fix the suction check valve 24 without play in the axial direction in the pump housing opening 20.

Figure 3:
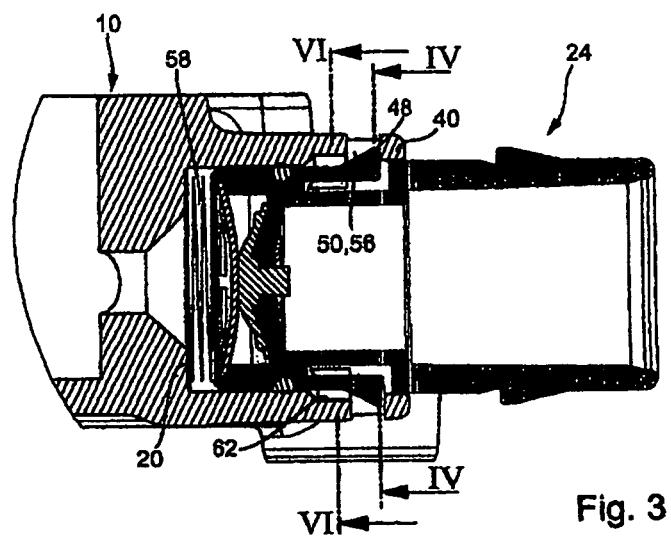
FIG. 3 shows a longitudinal section through a suction check valve inserted in a pump housing in accordance with a second embodiment.
Figure 4:
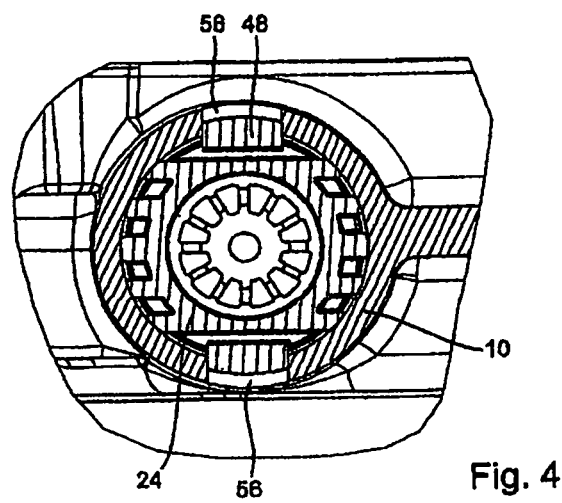
FIG. 4 shows a cross-section IV-IV in accordance with FIG. 3.

FIG. 3 shows a variant in which two opposing openings 56 are undercut. Each opening extends over approximately 30° in the circumferential direction slightly below the free end 40 of the pump housing 10 as is illustrated in FIG. 4. The latches 49 of the latching fingers engage in this opening 56 when the suction check valve 24 is inserted. One can also see that a coiled spring 58 abuts the front side of the suction check valve 24, which is compressed at the bottom of the pump housing opening 20 upon insertion of the suction check valve 24.

As is clearly visible in FIG. 4, the width of the latch 48 corresponds to the width of the opening 56. This prevents rotation of the suction check valve 24 when the suction check valve 24 is locked.

Figure 5:
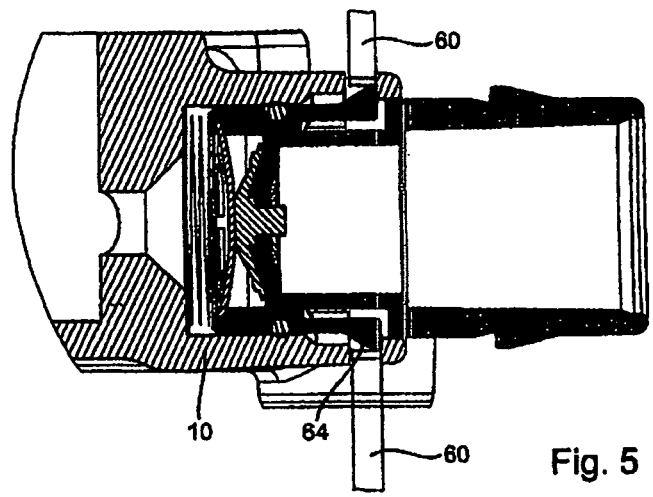
FIG. 5 shows the view in accordance with FIG. 3 with inserted tools for releasing the locking.

The locking is released by means of a tool 60 which is radially inserted from the outside into the (in each) opening 56 (FIG. 5). The latches 48 are radially pushed into and out of the opening 56 by means of this tool 60 such that the free end 40 of the pump housing 10 no longer overlaps them. The suction check valve 24 can then be removed or the suction check valve 24 is pushed out of the pump housing opening 20 by means of the coiled spring 58.

Figure 6:
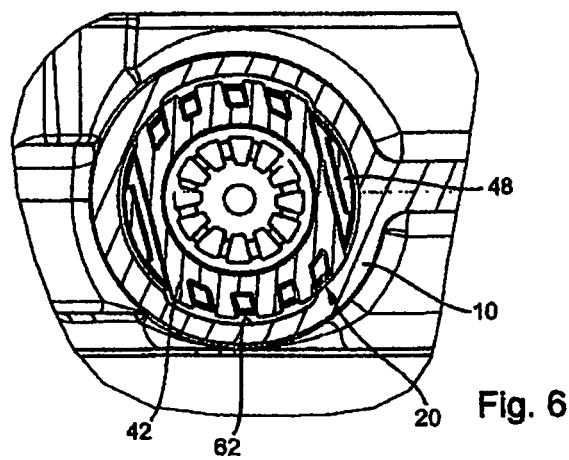
FIG. 6 shows a cross-section VI-VI in accordance with FIG. 3.

In another variant for releasing the locking, an inner circumferential groove 62 (FIGS. 3 and 6) is provided which, in the insertion direction of the suction check valve 24, directly adjoins the opening 56 or generally adjoins the undercut 50 and has a larger diameter than the diameter of the free end 40 of the pump housing 10 or the pump housing opening 20. The inner circumferential groove extends over part of the inner circumference and terminates at the diameter of the pump housing opening 20. When the suction check valve 24 is inserted, the latches 48 gain entrance to the inner circumferential groove 62. When the suction check valve 24 is then turned e.g. through 30, the latches 48 are lifted out of the inner circumferential groove 62 and abut the inner surface of the pump housing opening 20 (see FIG. 6). The suction check valve 24 can then be removed.

It is also possible to design the latches 48 without inclination 64 but in a cuboid shape. It is then no longer possible to insert the suction check valve 24 into the pump housing opening 20 without the tool 60. The free end 40 of the pump housing 10 is then provided with a funnel-shaped insertion inclination. In simple embodiments, it is also possible to completely omit the inner circumferential wall 62.

We claim:

1. A vacuum pump or a vane cell pump, the pump comprising:
 a pump housing defining a suction chamber and having a pump housing opening which opens into said suction chamber; and
 a suction check valve configuration disposed in said pump housing opening, said valve configuration opening to an outside or into an external vacuum chamber and having a suction check valve housed in a pot-shaped valve housing comprising a housing jacket, one of said suction check valve configuration and said pump housing opening having an undercut or circumferential groove provided on an outer side of said housing jacket or on an inner side of said pump housing opening, one of said suction check valve configuration and said pump housing opening also having a latching hook comprising a latching finger having a latch, wherein said latching finger can be radially pivoted with respect to said housing jacket and said latch engages in said circumferential groove in response to axially directed insertion of said suction check valve configuration into said pump housing opening to lock said suction check valve configuration in said pump housing opening, wherein said latching hook is disposed, structured and dimensioned in such a manner that said latch is compression loaded when said suction check valve configuration is subjected to an axial load which urges said suction check valve out of said pump housing opening.

2. The vacuum pump of claim 1, wherein said latching hook is disposed radially outside of said housing jacket.

3. The vacuum pump of claim 1, wherein said latch has a square cross-section or an inclination.

4. The vacuum pump of claim 1, wherein locking prevents rotation of said suction check valve configuration.

5. The vacuum pump of claim 1, wherein said housing jacket has a circumferential groove with an inserted sealing ring, said sealing ring being supported on a recessed edge of said pump housing opening and forming a pretensioning means that pretensions the suction check valve configuration in a direction of removal.

6. The vacuum pump of claim 1, wherein said undercut is formed by at least one undercut opening in said pump housing.

7. The vacuum pump of claim 6, wherein said undercut opening is structured to permit insertion of a tool for lifting said latch out of said undercut opening.

8. The vacuum pump of claim 6, wherein said pump housing has an inner circumferential groove disposed between said undercut opening and said suction opening and proximate said undercut opening, said circumferential groove terminating, in a circumferential direction, in an inner circumferential surface of said pump housing opening.

* * * * *